3,198,835
PYRENYL METHYL TERTIARY AMINO
AMINES
Robert L. Clarke, Bethlehem, N.Y., and Johannes S. Buck,
deceased, late of Albany, N.Y., by Phillis G. Buck,
executrix, Ridgewood, N.J., assignors to Sterling Drug
Inc., New York, N.Y., a corporation of Delaware
No Drawing. Filed July 25, 1960, Ser. No. 45,230
8 Claims. (Cl. 260—570.9)

This invention relates to monosubstituted pyrenes. More particularly, this invention is concerned with certain new tertiary-aminomethylpyrenes, with pyrenylmethyl quaternary ammonium salts, and with processes and intermediates in the preparation of said new compounds.

The compounds of the instant invention are compounds of the formula, $Y-CH_2-C_{16}H_9$, wherein Y represents tertiary-amino and $C_{16}H_9$ represents the unsubstituted pyrenyl radical, and quaternary ammonium salts represented by the formula, $Q^+-CH_2-C_{16}H_9An^-$, wherein $Q^+$ represents quaternary ammonium, $An^-$ represents an anion, and $C_{16}H_9$ repersents pyrenyl.

The tertiary-aminomethylpyrenes and pyrenylmethyl quaternary ammonium salts are represented in the free base or cation form, respectively, by the structural formula

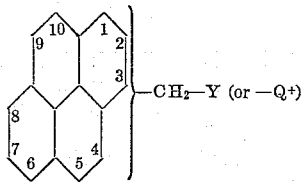

wherein Y and $Q^+$ have the meanings indicated above. The free bases of the formula $Y-CH_2-C_{16}H_9$ react with organic and inorganic acids to form acid-addition salts which are the full equivalents of the free bases.

The numbering system used for the pyrene system is given in the above structural formula. There are three possible monosubstituted pyrenes, i.e., by substitution in the 1-, 2- or 4-positions. In monosubstituted pyrenes, the 1-, 3-, 6- and 8-positions are equivalent, the 2- and 7-positions are equivalent, and the 4-, 5-, 9- and 10-positions are equivalent. Compounds substituted in any one of these three positions are within the purview of the invention, although the 1-substituted compounds are preferable in view of the more ready availability of starting materials.

In the compounds of formula $Y-CH_2-C_{16}H_9$, Y stands for a tertiary-amino radical. The tertiary-amino radical is preferably one having a molecular weight less than about 200 and which is basic in nature. By tertiary-amino is meant a monovalent grouping of the type RR'N—, wherein R and R' are both organic substituents, optionally joined to form a cycle, so that the complete molecule to which it is attached is a tertiary amine. Basic tertiary-amino radicals are those of the aliphatic or araliphatic type that impart to the molecules which contain them sufficient basicity (ionization at least to the extent of $10^{-6}$) so that the compounds readily form acid-addition salts with strong inorganic and organic acids. Such tertiary-amino groups include di-lower-alkylamino, for example, dimethylamino and diethylamino; dicycloalkylamino in which cycloalkyl has from 3 to 7 ring members, for example, dicyclopentylamino and dicyclohexylamino; N-(cycloalkyl)-lower-alkylamino in which the cycloalkyl has from 3 to 7 ring members, for example, N-methylcyclohexylamino and N-ethylcyclopentylamino; polymethylenimino having from 5 to 7 ring members, for example, 1-pyrrolidyl, 1-piperidyl, hexamethylenimino and lower-alkylated derivatives thereof; 4-morpholinyl; di-(phenyl-lower-alkyl)amino, for example, dibenzylamino and bis(phenylethyl)amino; and N-(phenyl-lower-alkyl)-lower-alkylamino, for example, N-benzylmethylamino. In the foregoing radicals, the term lower-alkyl stands for alkyl groups containing from to about six carbon atoms. The foregoing tertiary-amino groupings can also be substituted by conventional simple substitutents, such as halogen, hydroxy, cyano, carboalkoxy, and the like, which do not affect the pharmacological usefulness of the physical embodiments of the molecular structures herein disclosed and claimed.

A particularly preferred group of tertiary-amino groupings are those of the type RR'N—, wherein R and R' represent members of the group consisting of lower-alkyl, hydroxy-lower-alkyl, halo-lower-alkyl and cyano-lower-alkyl. The hydroxy, halo or cyano groups are preferably separated from the nitrogen atom by at least two carbon atoms.

Another aspect of the invention relates to quaternary ammonium salts represented by the formula $$Q^+-CH_2-C_{16}H_9An^-$$

wherein $Q^+$ represents quaternary ammonium. The quarternary ammonium moiety preferably has a molecular weight less than about 200. By the quaternary ammonium moiety is meant a monovalent grouping of the type $ZZ'Z''N^+$—, wherein Z, Z' and Z'' are organic substitutents, optionally joined to form a cycle. Z, Z' and Z'' stand for such substituents as lower-alkyl, cycloalkyl having from 3 to 7 ring carbon atoms, phenyl-lower-alkyl, and the like, including such groupings further substituted by functional groups such as hydroxy, cyano, acylamido, carbamyl and carbo-lower-alkoxy. When two or three of Z, Z' and Z'' are joined to form a cycle, the quaternary ammonium moiety includes such structures as pyridinium, piperidinium, morpholinium, quinolinium, and the like.

The tertiary-aminomethylpyrenes of the formula $Y-CH_2-C_{16}H_9$ are prepared by reacting halomethylpyrene, $X-CH_2-C_{16}H_9$, wherein X is halogen, with a secondary amine in the presence of an acid acceptor. The reaction conditions are not critical, and the process can be carried out under a wide range of conditions, preferably at temperatures between about 50° C. and 150° C. in an organic solvent inert under the conditions of the reaction, such as anhydrous ethanol, benzene, xylene, and the like. The purpose of the acid acceptor is to take up the hydrogen halide which is split out during the course of the reaction. The acid acceptor is a basic substance which forms water-soluble byproducts easily separable from the main product of the reaction, and includes such substances as alkali metal salts of weak acids, e.g., sodium carbonate, potassium carbonate, sodium acetate, sodium alkoxides, sodium amide, and the like. The acid acceptor can also be in the form of an excess quantity of the secondary amine reactant. In the halomethylpyrene reactant the halogen is preferably chlorine, but can also be bromine or iodine.

The pyrenylmethyl quaternary ammonium salts of the formula $Q^+-CH_2-C_{16}H_9An^-$ are prepared by reacting halomethylpyrene, $X-CH_2-C_{16}H_9$, where X is halogen, with a tertiary amine. The reaction conditions are not critical, and the process can be carried out by simple admixture of the components, either alone or in an inert organic solvent. The reaction can be accelerated by heating. The compound produced is a quaternary ammonium halide. In the event a compound with a different anion is desired it can be obtained by ion exchange procedures, for example, by converting the quaternary ammonium halide to a quaternary ammonium hydroxide by the action of silver oxide and neutralizing the quaternary base with any desired acid; or by passing a solution of the quaternary ammonium halide through an ion exchange resin saturated with the desired anion.

The nature of the anions in the acid-addition salt forms of the tertiary amines, Y—$CH_2$—$C_{16}H_9$, and in the quaternary ammonium salts, $Q^+$—$CH_2$—$C_{16}H_9An^-$, are not material to the invention. For pharmaceutical use it is of course necessary to employ salts whose anions are pharmacologically acceptable; however, salts having toxic anions are useful as intermediates in the purification of the free bases, in conversion to other salts by ion exchange procedures, and as characterizing derivatives of the free bases.

An alternative method for preparing the compounds of the invention comprises reacting pyrenylmethylamine ($H_2N$—$CH_2$—$C_{16}H_9$) with one or more alkylating agents under conditions conventionally employed for alkylating primary amines. Thus, tertiary amines of the type RR'N—$CH_2$—$C_{16}H_9$, where R and R' are monovalent substituents aliphatically bound to the nitrogen, are prepared by reacting the pyrenylmethylamine stepwise with RX and R'X where X is the acid radical derived from a strong acid, preferably halogen. In the event that R and R' are identical, the reaction can be carried out in a single operation using an excess of alkylating agent. Quaternary ammonium salts of the type RR'R''N$^+$—$CH_2$—$C_{16}H_9X^-$ can be obtained by further reaction of the tertiary amine, RR'N—$CH_2$—$C_{16}H_9$ with R''X. The starting material, pyrenylmethylamine, is in turn prepared by hydrogenating the corresponding pyrenealdoxime (HON=CH—$C_{16}H_9$) produced from pyrenecarboxaldehyde (O=CH—$C_{16}H_9$).

Biological evaluation of the compounds of the invention has shown that they possess valuable pharmacological, chemotherapeutical and biochemical properties, for example, coronary dilator activity, antibacterial and antifungal activity, and cholesterol synthesis inhibiting properties. The compounds can be prepared for use as tablets compounded with conventional excipients for oral administration, or as aqueous solutions for parenteral or intravenous administration. When the compounds are used as antiseptics, they can be employed as dilute solutions for topical application to any surface.

The structures of the compounds of the invention were established by the mode of their preparation and by chemical analysis for the percentage composition of the elements present.

The following examples will further illustrate the invention without the latter being limited thereby.

EXAMPLE 1

*N-ethyl-N-(2-hydroxyethyl)-1-pyrenylmethylamine*

A mixture of 7.52 g. (0.03 mole) of 1-chloromethylpyrene, 8.01 g. (0.09 mole) of N-ethyl-N-(2-hydroxyethyl)amine and 50 ml. of absolute ethanol was refluxed for twenty-four hours. The reaction mixture was concentrated in vacuo, and the residue was dissolved in 100 ml. of chloroform and washed with saturated sodium bicarbonate solution and with water. The aqueous washings were back-extracted with chloroform and the combined chloroform solutions were concentrated in vacuo. The residue was dissolved in 15 ml. of absolute ethanol, 5 ml. of 6.9 N hydrogen chloride in absolute ethanol was added and the solution was slowly diluted with 100 ml. of ether. The resulting solid product was collected by filtration, recrystallized from 95% ethanol and dried at 80° C. (0.1 mm.) for six hours over anhydrous calcium sulfate to give N-ethyl-N-(2-hydroxyethyl)-1-pyrenylmethylamine in the form of its hydrochloride salt, cream-colored crystals, M.P. 211.4–213.8° C. (corr.).

*Analysis.*—Calcd. for $C_{21}H_{21}NO \cdot HCl$: C, 74.21; H, 6.53; Cl, 10.43. Found: C, 74.40; H, 6.40; Cl, 10.65.

N-ethyl-N-(2-hydroxyethyl)-1-pyrenylmethylamine in the form of its hydrochloride salt was found to have a coronary dilator activity of about one-half that of papaverine when measured on the isolated rabbit heart.

EXAMPLE 2

*N-(2-chloroethyl)-N-ethyl-1-pyrenylmethylamine*

A mixture of 14.3 g. (0.0421 mole) of N-ethyl-N-(2-hydroxyethyl)-1-pyrenylmethylamine, 100 ml. of thionyl chloride and 150 ml. of dry chloroform was refluxed for one and three-quarter hours on a steam bath. The reaction mixture was concentrated in vacuo, the residue was stirred with 100 ml. of absolute ethanol, and the solid product (14.3 g.) was collected, recrystallized three times from methanol and dried at 80° C. (0.01 mm.) over phosphorus pentoxide for eighteen hours to give N-(2-chloroethyl)-N-ethyl-1-pyrenylmethylamine in the form of its hydrochloride salt, pale tan crystals, M.P. 216.0–217.6° C. (dec.) (corr.).

*Analysis.*—Calcd. for $C_{21}H_{20}ClN \cdot HCl$: C, 70.39; H, 5.91; $Cl_{(total)}$, 19.79; $Cl_{(ionic)}$, 9.90. Found: C, 70.10; H, 6.20; $Cl_{(total)}$, 19.77; $Cl_{(ionic)}$, 9.76.

EXAMPLE 3

*N,N-diethyl-1-pyrenylmethylamine*

A mixture of 15.0 g. of 1-chloromethylpyrene, 17.52 g. of diethylamine and 100 ml. of benzene was refluxed for seventeen hours. A precipitate of diethylamine hydrochloride formed which was removed by filtration, and the filtrate was concentrated in vacuo. The residue was recrystallized from acetonitrile and dried at room temperature (0.01 mm.) over phosphorus pentoxide for twenty-two hours to give 13.05 g. of N,N-diethyl-1-pyrenylmethylamine, colorless needles, M.P. 56.0–59.8° C. (corr.).

*Analysis.*—Calcd. for $C_{21}H_{21}N$: C, 87.76; H, 7.37; N, 4.87. Found: C, 87.93; H, 7.37; N, 4.82.

N,N-diethyl-1-pyrenylmethylamine in a concentration of 0.1% showed an inhibition of 46% in cholesterol synthesis from $C^{14}$ acetate by rat liver slices.

EXAMPLE 4

*Ethyl 4-phenyl-1-(1-pyrenylmethyl)piperidine-4-carboxylate*

A mixture of 8.09 g. (0.03 mole) of ethyl 4-phenylpiperidine-4-carboxylate hydrochloride, 7.5 g. (0.03 mole) of 1-chloromethylpyrene, 3.5 g. (0.033 mole) of pulverized anhydrous sodium carbonate and 150 ml. of dry benzene was refluxed for twenty-four hours. The mixture was extracted well with water and the water back-extracted with benzene. The combined benzene solutions where concentrated in vacuo, and the residue was recrystallized from acetone, using activated charcoal for decolorizing purposes, and dried at 100° C. (0.01 mm.) over phosphorus pentoxide for twelve hours to give ethyl 4-phenyl-1-(1-pyrenylmethyl)piperidine - 4 - carboxylate, colorless crystals, M.P. 137.6–139.2° C. (corr.).

*Analysis.*—Calcd. for $C_{31}H_{29}NO_2$: C, 83.19; H, 6.53; $C_2H_5O$, 10.07. Found: C, 82.96; H, 6.36; $C_2H_5O$, 10.06.

EXAMPLE 5

N-(4-chlorobenzyl)-N-methyl - 1 - pyrenylmethylamine was prepared from 15.0 g. of 1-chloromethylpyrene, 18.66 g. of N-(4-chlorobenzyl)methylamine and 125 ml. of benzene according to the manipulative procedure described above in Example 4. The product was recrystallized from acetonitrile to give N-(4-chlorobenzyl)-N-methyl-1-pyrenylmethylamine, colorless crystals, M.P. 93.2–94.4° C. (corr.).

*Analysis.*—Calcd. for $C_{25}H_{20}ClN$: C, 81.18; H, 5.45; Cl, 9.57. Found: C, 81.10; H, 5.58; Cl, 9.70.

EXAMPLE 6

*N,N-bis(2-hydroxyethyl)-1-pyrenylmethylamine*

A mixture of 15.7 g. of 1-chloromethylpyrene, 26.25 g. of freshly distilled diethanolamine and 200 ml. of acetonitrile was refluxed for twenty-four hours. The reaction mixture was concentrated in vacuo, and the residue was taken up in chloroform and washed with water and dilute potassium carbonate solution. The chloroform solution was concentrated in vacuo and the residue crystallized from ethyl acetate to give 17.85 g. of product. The latter was again recrystallized from ethyl acetate and dried at 78° C. (0.01 mm.) over phosphorus pentoxide for twelve hours to give N,N-bis(2-hydroxyethyl)-1-pyrenylmethylamine, cream-colored solid, M.P. 115.4–117.4° C. (corr.).

Analysis.—Calcd. for $C_{21}H_{21}NO_2$: C, 78.97; H, 6.63; N, 4.39. Found: C, 78.71; H, 6.32; N, 4.28.

N,N - bis(2-hydroxyethyl)-1-pyrenylmethylamine was found to have a coronary dilator activity about twice that of papaverine when measured on the isolated rabbit heart.

EXAMPLE 7

N,N-bis(2-chloroethyl)-1-pyrenylmethylamine was prepared from 12.78 g. of N,N-bis(2-hydroxyethyl)-1-pyrenylmethylamine, 100 ml. of thionyl chloride and 200 ml. of chloroform according to the manipulative procedure described above in Example 2. There was thus obtained 14.9 g. of product which was recrystallized first from dimethylformamide and then from methanol and dried at 78° C. (0.01 mm.) over phosphorus pentoxide for twenty-four hours to give N,N-bis(2-chloroethyl)-1-pyrenylmethylamine in the form of its hydrochloride salt, rose-colored crystals, M.P. 186.2–192.0° C. (dec.) (corr.).

Analysis.—Calcd. for $C_{21}H_{19}Cl_2N.HCl$: C, 64.23; H, 5.13; Cl. 27.08. Found: C, 64.49; H, 5.04; Cl, 26.77.

EXAMPLE 8

N,N-di-n-hexyl-1-pyrenylmethylamine can be prepared by reacting 1-chloromethylpyrene with di-n-hexylamine according to any of the manipulative procedures described above in Examples 1, 3 or 4.

EXAMPLE 9

N,N-dicyclohexyl-1-pyrenylmethylamine can be prepared by reacting 1-chloromethylpyrene with dicyclohexylamine according to any of the manipulative procedures described above in Examples 1, 3 or 4.

EXAMPLE 10

N-cyclopentyl-N-methyl-1-pyrenylmethylamine can be prepared by reacting 1-chloromethylpyrene with N-cyclopentyl-N-methylamine according to any of the manipulative procedures described above in Examples 1, 3 or 4.

EXAMPLE 11

1-(1-pyrrolidylmethyl)pyrene can be prepared by reacting 1-chloromethylpyrene with pyrrolidine according to any of the manipulative procedures described above in Examples 1, 3 or 4.

EXAMPLE 12

1-(1-piperidylmethyl)pyrene can be prepared by reacting 1-chloromethylpyrene with piperidine according to any of the manipulative procedures described above in Examples 1, 3 or 4.

EXAMPLE 13

1-(4-methyl-1-piperidylmethyl)pyrene can be prepared by reacting 1-chloromethylpyrene with 4-methylpiperidine according to any of the manipulative procedures described above in Examples 1, 3 or 4.

EXAMPLE 14

1-(hexamethyleniminomethyl)pyrene can be prepared by reacting 1-chloromethylpyrene with hexamethylenimine according to any of the manipulative procedures described above in Examples 1, 3 or 4.

EXAMPLE 15

1-(4-morpholinylmethyl)pyrene can be prepared by reacting 1-chloromethylpyrene with morpholine according to any of the manipulative procedures described above in Examples 1, 3 or 4.

EXAMPLE 16

N,N-bis(2-phenylethyl)-1-pyrenylmethylamine can be prepared by reacting 1-chloromethylpyrene with N,N-bis(2-phenylethyl)amine according to any of the manipulative procedures described above in Examples 1, 3 or 4.

EXAMPLE 17

N,N-diethyl-4-pyrenylmethylamine can be prepared by reacting 4-chloromethylpyrene with diethylamine according to any of the manipulative procedures described above in Examples 1, 3 or 4.

EXAMPLE 18

N,N-diethyl-2-pyrenylmethylamine can be prepared by reacting 2-chloromethylpyrene with diethylamine according to any of the manipulative procedures described above in Examples 1, 3 or 4. 2-chloromethylpyrene can be prepared from pyrene-2-carboxylic acid by reduction with lithium aluminum hydride, followed by reacting the resulting 2-hydroxymethylpyrene with thionyl chloride.

EXAMPLE 19

*N,N-dimethyl-N-(2-hydroxyethyl)-N-(1-pyrenylmethyl)ammonium chloride*

A solution of 2.67 g. (0.03 mole) of freshly distilled N,N-dimethyl-2-hydroxyethylamine in 20 ml. of dry acetone was added to a solution of 7.5 g. (0.03 mole) of 1-chloromethylpyrene in 180 ml. of dry acetone, and the mixture was refluxed for eighteen hours. The reaction mixture was cooled, and the solid product which separated was collected by filtration, giving 9.75 g., M.P. 207–209° C. (uncorr.). The latter product was recrystallized from methanol using activated charcoal for decolorizing purposes and dried at 85° C. (0.01 mm.) over phosphorus pentoxide for eighteen hours to give N,N - dimethyl - N-(2-hydroxyethyl)-N-(1-pyrenylmethyl)ammonium chloride, pale yellow crystals, M.P. 210.6–214.2° C. (corr.).

Analysis.—Calcd. for $C_{21}H_{22}ClNO$: C, 74.21; H, 6.53; Cl, 10.43. Found: C, 74.32; H, 6.60; Cl, 10.31.

N,N - dimethyl - N-(2-hydroxyethyl)-N-(1-pyrenylmethyl)ammonium chloride can be reacted in aqueous solution with silver oxide to produce a precipitate of silver chloride in a solution containing N,N-dimethyl-N-(2 - hydroxyethyl) - N-(1-pyrenylmethyl)ammonium hydroxide. The silver chloride can be removed by filtration, and the filtrate containing the substituted ammonium hydroxide can then be neutralized with any desired acid, e.g., hydrofluoric acid, hydrobromic acid, hydriodic acid, acetic acid, lactic acid, quinic acid, and the like to produce a solution of the corresponding quaternary ammonium salt where the anion is fluoride, bromide, iodide, acetate, lactate, quinate, and the like, respectively.

N,N - dimethyl - N-(2-hydroxyethyl)-N-(1-pyrenylmethyl)ammonium fluoride can be converted to N,N-dimethyl - N - (2-hydroxyethyl)-N-(1-pyrenylmethyl)ammonium bromide by passing the former through an ion exchange resin saturated with bromide ion.

EXAMPLE 20

N,N - dimethyl - N-(2-cyanoethyl)-N-(1-pyrenylmethyl)ammonium chloride was prepared from 6.25 g. of 1-chloromethylpyrene, 2.45 g. of freshly distilled N,N-dimethyl-2-cyanoethylamine and 175 ml. of dry acetone according to the manipulative procedure described above in Example 19. There was thus obtained 6.35 g. of product which was recrystallized from absolute ethanol and dried at 63° C. over phosphorus pentoxide for twenty-four hours to give N,N-dimethyl-N-(2-cyanoethyl)-N-(1-pyrenylmethyl)ammonium chloride, colorless crystals, M.P. 270.0–276.4° C. (dec.) (corr.).

*Analysis.*—Calcd. for $C_{22}H_{21}ClN_2$: C, 75.74; H, 6.07; Cl, 10.16. Found: C, 75.73; H, 6.34; Cl, 10.01.

EXAMPLE 21

N,N,N - triethyl-N-(1-pyrenylmethyl)ammonium chloride was prepared from 7.5 g. of 1-chloromethylpyrene, 5 ml. of freshly distilled triethylamine and 250 ml. of dry acetone according to the manipulative procedure described above in Example 19. The product was recrystallized twice from ethanol to give N,N,N-triethyl-N-(1-pyrenylmethyl)ammonium chloride in the form of a monohydrate, light pink crystals, M.P. 155.0–158.6° C. (dec.) (corr.).

*Analysis.*—Calcd. for $C_{23}H_{26}ClN.H_2O$: C, 74.67; H, 7.63; Cl, 9.59; $H_2O$, 4.87. Found: C, 74.55; H, 7.49; Cl, 9.57; $H_2O$, 4.76.

N,N,N - triethyl-N-(1-pyrenylmethyl)ammonium chloride in a concentration of 0.1% showed an inhibition of 60% in cholesterol synthesis from $C^{14}$ acetate by rat liver slices.

N,N,N - triethyl-N-(1-pyrenylmethyl)ammonium chloride showed a bacteriostatic activity in vitro against *Staph. aureus* at a dilution of 1:100,000.

EXAMPLE 22

3 - acetamido-N-(1-pyrenylmethyl)pyridinium chloride was prepared from 7.5 g. of 1-chloromethylpyrene, 4.08 g. of 3-acetamidopyridine (M.P. 132–4° C., freshly recrystallized from ethyl acetate) and 100 ml. of dry acetone according to the manipulative procedure described above in Example 19. There was thus obtained 8.3 g. of product which was recrystallized twice from 95% ethanol and dried at 86° C. (0.01 mm.) over phosphorus pentoxide for one hour to give 3-acetamido-N-(1-pyrenylmethyl)pyridinium chloride, pale yellow crystals, M.P. 234.4–236.8° C. (corr.).

*Analysis.*—Calcd. for $C_{24}H_{19}ClN_2O$: N, 7.24; Cl, 9.17. Found: N, 7.02; Cl, 9.09.

EXAMPLE 23

N-(1-pyrenylmethyl)pyridinium chloride was prepared from 7.5 g. of 1-chloromethylpyrene, 2.37 g. of dry pyridine and 125 ml. of dry acetone according to the manipulative procedure described above in Example 19. The product was recrystallized twice from water and then from an absolute ethanol-ether mixture, and dried at 86° C. (0.01 mm.) over phosphorus pentoxide for eight hours to give N-(1-pyrenylmethyl)pyridinium chloride, cream-colored solid, M.P. 222.0–224.0° C. (dec.) (corr.).

*Analysis.*—Calcd. for $C_{22}H_{16}ClN$: C, 80.11; H, 4.87; Cl, 10.75. Found: C, 80.12; H, 4.97; Cl, 10.57.

N-(1-pyrenylmethyl)pyridinium chloride was found to have a coronary dilator activity about equal to that of papaverine when measured on the isolated rabbit heart.

N-(1-pyrenylmethyl)pyridinium chloride in a concentration of 0.1% showed an inhibition of 56% in cholesterol synthesis from $C^{14}$ acetate by rat liver slices.

N-(1-pyrenylmethyl)pyridinium chloride showed a bacteriostatic activity in vitro against *Staph. aureus* at a dilution of 1:100,000.

EXAMPLE 24

8-(1-pyrenylmethyl)-3-hydroxynortropane methochloride was prepared from 7.4 g. of 1-chloromethylpyrene, 4.2 g. of tropine and 100 ml. of dry acetone according to the manipulative procedure described above in Example 19. There was thus obtained 10.72 g. of product which was recrystallized from water and dried at 86° C. (0.01 mm.) over phosphorus pentoxide for four hours to give 8-(1-pyrenylmethyl) - 3 - hydroxynortropane methochloride in the form of a monohydrate, colorless crystals, M.P. 214.8–217.6° C. (corr.).

*Analysis.*—Calcd. for $C_{25}H_{26}ClNO.H_2O$: C, 73.24; H, 6.88; Cl, 8.65. Found: C, 73.38; H, 6.73; Cl, 8.66.

8 - (1-pyrenylmethyl)-3-hydroxynortropane methochloride in a concentration of 0.1% showed an inhibition of 34% in cholesterol synthesis from $C^{14}$ acetate by rat liver slices.

EXAMPLE 25

N-(1-pyrenylmethyl)-N-methylmorpholinium chloride was prepared from 12.54 g. of 1-chloromethylpyrene, 5.05 g. of freshly distilled N-methylmorpholine and 250 ml. of dry acetone according to the manipulative procedure described above in Example 19. There was thus obtained 14.4 g. of product which was recrystallized from methanol and from a methanol-ether mixture, and dried at 86° C. (0.01 mm.) over phosphorus pentoxide for six hours to give N-(1-pyrenylmethyl)-N-methylmorpholinium chloride, colorless powder, M.P. 220.0–224.4° C. (corr.).

*Analysis.*—Calcd. for $C_{22}H_{22}ClNO$: C, 75.09; H, 6.30; Cl, 10.08. Found: C, 75.27; H, 6.57; Cl, 9.98.

N-(1-pyrenylmethyl)-N-methylmorpholinium chloride in a concentration of 0.1% showed an inhibition of 55% in cholesterol synthesis from $C^{14}$ acetate by rat liver slices.

N-(1-pyrenylmethyl)-N-methylmorpholinium chloride showed a fungistatic activity in vitro against *T. mentagrophytes* and *As. niger* at a concentration of 1:10,000.

EXAMPLE 26

3-carbamyl-N-(1 - pyrenylmethyl)pyridinium chloride was prepared from 12.54 g. of 1-chloromethylpyrene, 6.1 g. of nicotinamide and 250 ml. of dry acetone according to the manipulative procedure described above in Example 19. The product was recrystallized from benzene and twice from methanol and dried at 78° C. (0.01 mm.) over phosphorus pentoxide for six hours to give 3-carbamyl-N-(1-pyrenylmethyl)pyridinium chloride, tan crystals, M.P. 233.0–235.4° C. (corr.).

*Analysis.*—Calcd. for $C_{23}H_{17}ClN_2O$: N, 7.51; Cl, 9.51. Found: N, 7.20; Cl, 9.53.

3-carbamyl-N-(1 - pyrenylmethyl)pyridinium chloride showed bacteriostatic activity in vitro against *Staph. aureus* at a dilution of greater than 1:100,000.

EXAMPLE 27

N,N - diethyl-N-(2-hydroxyethyl)-N-(1 - pyrenylmethyl)ammonium chloride was prepared from 7.5 g. of 1-chloromethylpyrene, 3.5 g. of freshly distilled N,N-diethyl-2-hydroxyethylamine and 250 ml. of dry acetone according to the manipulative procedure described above in Example 19. The reaction mixture was refluxed for eighty-eight hours, and the product (6.7 g.) was recrystallized from benzene and from methanol and dried at 78° C. (0.01 mm.) over phosphorus pentoxide for eighteen hours to give N,N-diethyl-N-(2-hydroxyethyl)-N-(1-pyrenylmethyl)ammonium chloride, cream-colored solid, M.P. 166.0–169.0° C. (corr.).

*Analysis.*—Calcd. for $C_{23}H_{26}ClNO$: C, 75.08; H, 7.12; Cl, 9.64. Found: C, 75.30; H, 7.00; Cl, 9.64.

N,N-diethyl-N-(2-hydroxyethyl)-N-(1 - pyrenylmethyl)ammonium chloride in a concentration of 0.01% showed an inhibition of 57% in cholesterol synthesis from $C^{14}$ acetate by rat liver slices.

N,N - diethyl-N-(2-hydroxyethyl)-N-(1 - pyrenylmethyl)ammonium chloride showed a bacteriostatic activity in vitro against *Staph. aureus* at a dilution of 1:100,000.

N,N - diethyl-N-(2-hydroxyethyl)-N-(1 - pyrenylmethyl)ammonium chloride showed a fungistatic and fungicidal activity in vitro against *T. mentagrophytes* at dilutions of 1:13,000 and 1:10,000, respectively. It showed a fungistatic activity in vitro against *As. niger* and *Monilia albicans* at a dilution of 1:10,000.

EXAMPLE 28

4-carbomethoxy-N-(1-pyrenylmethyl)pyridinium chloride was prepared from 12.54 g. of 1-chloromethylpyrene, 6.85 g. of freshly distilled methyl isonicotinate and 250 ml. of dry acetone according to the manipulative procedure described above in Example 19. The reaction mixture was refluxed for 116 hours and the product was recrystallized from an absolute ethanol-ether mixture and dried at 100° C. (0.01 mm.) over phosphorus pentoxide for eight hours to give 4-carbomethoxy-N-(1-pyrenylmethyl)pyridinium chloride, yellow powder, M.P. 176.8–1.77.6° C. (corr.).

*Analysis.*—Calcd. for $C_{24}H_{18}ClNO_2$: C, 74.32; H, 4.68; Cl, 9.14. Found: C, 74.05; H, 4.90; Cl, 8.95.

EXAMPLE 29

N,N-dicyclohexyl-N-methyl-N-(1-pyrenylmethyl) ammonium chloride can be prepared by reacting 1-chloromethylpyrene with N,N-dicyclohexyl-N-methylamine according to the manipulative procedure described above in Example 19.

EXAMPLE 30

N,N-dimethyl-N-benzyl-N-(1-pyrenylmethyl)ammonium chloride can be prepared by reacting 1-chloromethylpyrene with N-N-dimethyl-N-benzylamine according to the manipulative procedure described above in Example 19.

EXAMPLE 31

N-methyl-N-(1-pyrenylmethyl)piperidinium chloride can be prepared by reacting 1-chloromethylpyrene with N-methylpiperidine according to the manipulative procedure described above in Example 19.

EXAMPLE 32

N-ethyl-N-(1-pyrenylmethyl)morpholinium chloride can be prepared by reacting 1-chloromethylpyrene with N-ethylmorpholine according to the manipulative procedure described above in Example 19.

EXAMPLE 33

N-(1-pyrenylmethyl)quinolinium chloride can be prepared by reacting 1-chloromethylpyrene with quinoline according to the manipulative procedure described above in Example 19.

EXAMPLE 34

N,N,N-triethyl-N-(4-pyrenylmethyl)ammonium chloride can be prepared by reacting 4-chloromethylpyrene with triethylamine according to the manipulative procedure described above in Example 19.

EXAMPLE 35

N,N,N-triethyl-N-(2-pyrenylmethyl)ammonium chloride can be prepared by reacting 2-chloromethylpyrene with triethylamine according to the manipulative procedure described above in Example 19.

EXAMPLE 36

Pyrene-1-aldoxime

A solution of 3.48 g. (0.05 mole) of hydroxylamine hydrochloride and 6.85 g. (0.05 mole) of sodium acetate trihydrate in 30 ml. of water was added to a solution of 11.5 g. (0.05 mole) of pyrene-1-aldehyde in 300 ml. of absolute ethanol, and the reaction mixture was refluxed for three hours and twenty minutes. The reaction mixture was cooled, and the solid product was collected by filtration and recrystallized from acetonitrile, removing insoluble inorganic material. The product was again recrystallized from acetonitrile using activated charcoal for decolorizing purposes and dried at 100° C. (0.5 mm.) over phosphorus pentoxide for seven hours to give pyrene-1-aldoxime, pale yellow needles, M.P. 192.2–194.0° C. (corr.).

*Analysis.*—Calcd. for $C_{17}H_{11}NO$: C, 83.24; H, 4.52; N, 5.71. Found: C, 83.31; H, 4.68; N, 5.48.

Pyrene-1-aldoxime showed fungistatic activity in vitro against *T. mentagrophytes* and *As. niger* at a dilution of 1:50,000.

EXAMPLE 37

1-pyrenylmethylamine

A mixture of 12.25 g. of pyrene-3-aldoxime, 0.5 g. of Adams platinum catalyst and 250 ml. of glacial acetic acid was hydrogenated in a Parr apparatus. Reduction was complete in six hours, and the reaction mixture was filtered and the filtrate concentrated in vacuo. The residue was recrystallized from 95% ethanol using activated charcoal for decolorizing purposes to give 7.95 g. of product, M.P. 172–175° C. (uncorr.). The latter material was recrystallized from absolute ethanol and dried at 78° C. in high vacuum over phosphorus pentoxide for one-half hour to give 1-pyrenylmethylamine in the form of its acetate salt, tan powder, M.P. 170.2–173.8° C. (dec.) (corr.).

*Analysis.*—Calcd. for $C_{17}H_{13}N \cdot C_2H_4O_2$: C, 78.33; H, 5.88; N, 4.81. Found: C, 78.28; H, 5.65; N, 4.71.

1-pyrenylmethylamine can be reacted with an excess of ethyl bromide to give N,N-diethyl-1-pyrenylmethylamine, the same product as obtained in Example 3.

We claim:

1. A compound, Y—$CH_2$—$C_{16}H_9$, wherein Y represents tertiary-amino and $C_{16}H_9$ represents pyrenyl, and where tertiary-amino is a member of the group consisting of:
   (a) di-lower-alkylamino,
   (b) dicycloalkylamino in which cycloalkyl has from 3 to 7 ring members,
   (c) N-(cycloalkyl)-lower-alkylamino in which cycloalkyl has from 3 to 7 ring members,
   (d) polymethylenimino of from 5 to 7 ring members,
   (e) 4-morpholinyl,
   (f) di-(phenyl-lower-alkyl)amino,
   (g) N-(phenyl-lower-alkyl)-lower-alkylamino, and
   (h) said members (a)–(g), inclusive, substituted by a member of the group consisting of lower-alkyl, halogen, hydroxy and cyano.
2. N-ethyl-N-(2-hydroxyethyl)-1-pyrenylmethylamine.
3. N-(2-chloroethyl)-N-ethyl-1-pyrenylmethylamine.
4. N,N-diethyl-1-pyrenylmethylamine.
5. N-(4-chlorobenzyl)-N-methyl-1-pyrenylmethylamine.
6. N,N-bis(2-hydroxyethyl)-1-pyrenylmethylamine.
7. N,N,bis(2-chloroethyl)-1-pyrenylmethylamine.
8. A compound of the formula

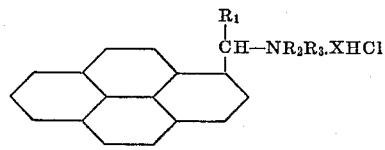

wherein $R_1$ is hydrogen; X is O; and $NR_2R_3$ is selected from the group consisting of morpholino, piperidino, pyrrolidino, and radicals having the formula:

wherein $R_2$ and $R_3$ are lower-alkyl radicals.

(References on following page)

References Cited by the Examiner

UNITED STATES PATENTS

| | | | |
|---|---|---|---|
| 2,676,987 | 4/54 | Lewis et al. | 260—570.9 |
| 2,734,920 | 2/56 | Hunter et al. | 260—570.9 |
| 2,807,614 | 9/57 | Lane | 260—247 |
| 2,880,211 | 3/59 | Elpern | 260—294.3 |
| 2,933,530 | 4/60 | Kralt et al. | 260—567.6 |
| 2,945,064 | 7/60 | Stammer | 260—566 |
| 2,959,618 | 11/60 | Kyrides | 260—570.9 |
| 2,971,028 | 2/61 | Gray | 260—566 |
| 2,993,894 | 7/61 | Marcus et al. | 260—247 |

OTHER REFERENCES

Marcus et al.: Journal of Organic Chemistry, vol. 25, pages 199 and 200 (1960).

NICHOLAS S. RIZZO, *Primary Examiner.*

IRVING MARCUS, *Examiner.*